United States Patent [19]
Braun

[11] 3,884,232
[45] May 20, 1975

[54] INSTRUMENT FOR ADMINISTERING TO THE HUMAN EYE

[76] Inventor: Ruth Braun, 27060 Cedar Rd., Beachwood, Ohio 44122

[22] Filed: June 5, 1974

[21] Appl. No.: 476,588

[52] U.S. Cl. ................ 128/260; 128/269; 132/88.7
[51] Int. Cl. ............................................. A61m 7/00
[58] Field of Search ............ 128/303, 20, 249, 304, 128/341, 260, 269; 132/79 A, 79 C, 88.7, DIG. 3

[56] References Cited
UNITED STATES PATENTS

| | | | |
|---|---|---|---|
| 3,054,398 | 9/1962 | Kobler | 128/20 |
| 3,439,674 | 4/1969 | Lelicoff | 128/249 X |
| 3,722,519 | 3/1973 | Epstein | 132/88.7 |

Primary Examiner—Lawrence W. Trapp
Attorney, Agent, or Firm—Wesley B. Taylor

[57] ABSTRACT

An instrument for administering to the human eye, either for medicinal or cosmetic purposes having a body of substantially sterile, resinous, organic material, such as a thermoplastic polymeric material like polyethylene, having a contact section provided with an outwardly directed concave contour. The contour section or portion is adapted to be placed in close proximity to and in matching configuration in contact with an upper and/or lower side of the human eye to steady the eye and facilitate application to or removal from the eye of adjunctive material. Preferably there are two of such contoured sections, and the instrument has a color contrasting with the normal colors of human eyelashes.

7 Claims, 4 Drawing Figures

PATENTED MAY 20 1975　　　　　　　　　　　　　　　3,884,232

INSTRUMENT FOR ADMINISTERING TO THE HUMAN EYE

BACKGROUND OF THE INVENTION

It is often necessary or desirable to administer to the human eye. For example, medicinally it may be necessary to apply an ophthalmic ointment or cream or eye drops; or cosmetically it may be desirable to apply or remove various beauty aids without smudging, such as mascara, lubricants, extenders to eyelashes, or even false eyelashes themselves.

Yet the human eye is one of the more delicate and easily damaged organs of the body. Rubbing about the eye and especially beneath it easily breaks skin tissue and can lead to wrinkles or infection. The eye is so sensitive to the touch and even to light that it is difficult for one to hold his eye in a steady, unflinching state. This is especially so when it is desired to apply or remove from the eye or the area immediately surrounding the eye an adjunctive material of the type described.

Therefore, it would advance the art to provide an instrument, implement or tool which facilitates treatment of the human eye with respect to an adjunctive material to be applied or removed.

SUMMARY OF THE INVENTION

The principal object of the present invention is to provide an instrument for administering to the human eye which facilitates the application or removal of a suitable material with respect to the eye and does so in a manner enabling the user to maintain his eye more nearly in an unflinching, relaxed state. Use of the present instrument is safe and minimizes or eliminates infection due to the breaking or bruising of adjacent facial skin tissue, as well as guarding against accidental touching or depositing of material within the eye itself when the material added is not intended to reach the eye.

In one form, the present invention includes an instrument having a body of substantially sterile, resinous organic material having a contact section or portion provided with an outwardly directed concave contour. The concave configuration is adapted to be placed in close proximity to and in substantially matching curvature in contact with an upper or lower side of the human eye. This has the effect of steadying the eye and facilitating application to or removal from the eye of various adjunctive materials.

Preferably, the instrument has a color contrasting with the normal colors of human eyelashes. The present instrument may have two contact sections, each provided with an outwardly directed concave contour, one section having a greater outwardly directed concavity than the other and being adapted for use with one particular side of a human eye, the other section being adapted for the remaining side of the eye.

BRIEF DESCRIPTION OF THE DRAWING

In the accompanying drawing.

DESCRIPTION OF THE PREFERRED EMBODIMENTS

In general, the present instrument includes a body of substantially sterile, resinous organic material having a contact section provided with an outwardly directed concave contour. By placing the contour in close proximity to an upper or lower side of a human eye and in contact with adjoining facial tissue, the eye is steadied and the application to or removal of various materials from the eye is considerably facilitated.

Figure 1:
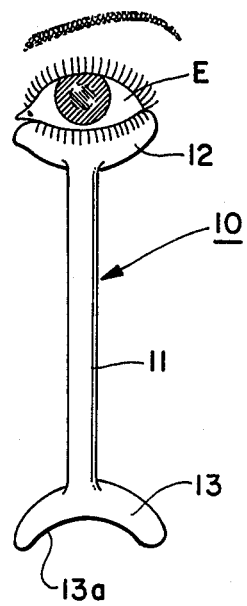
FIG. 1 is a front elevational view of one embodiment of the present invention, diagrammatically shown in position along the lower side of a human eye.
Figure 2:
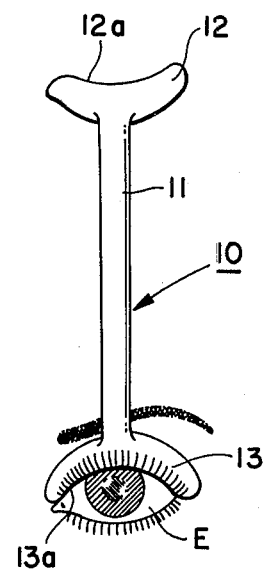
FIG. 2 is a front elevational view of the embodiment of FIG. 1, diagrammatically shown with another section of the embodiment in position along the upper side of the eye.
Figure 3:
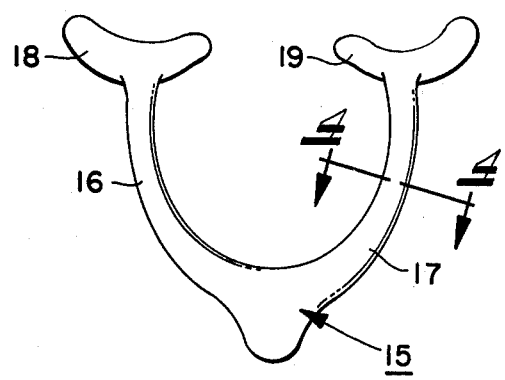
FIG. 3 is a front elevational view of another embodiment of the present invention.

Referring to FIGS. 1 through 3, for example, the illustrated embodiment comprises a body generally indicated at 10 having a relatively straight, central shank portion 11 which, for example, may be about six inches in length. The shank portion 11 terminates in opposite, outwardly directed concave portions or sections 12 and 13.

Body 10 preferably comprises a resinous, organic material which is safe to use in proximity to an eye generally indicated at E. Body 10 may be fabricated, for instance, from a thermoplastic, polymeric resin which can be easily molded as by injection molding. Examples of such polymeric resins include polyethylene, polypropylene, nylon, polystyrene, polyvinyl chloride, polymethacrylic acid, polymethacrylic acid esters, polyvinyl acetate, and the like. These materials can be readily cleaned and washed, as by ordinary soap and water, and maintained in sterile or substantially sterile condition. Accordingly the present instrument made from such resins can be used with comparative safety in contact with facial tissue and in close proximity to a human eye.

While an instrument of the present invention may contain only one outwardly directed, concave section, it is preferred to have two such sections, one designed for each of the upper and lower sides or edges of an eye. As a rule, the upper side of a human eye has a greater curvature than the lower side. In the embodiment of FIGS. 1 and 2, section 12 has less curvature as along contour outline 12a than section 13 and is designed for use with the lower side of eye E, as illustrated in FIG. 1. Section 12 is shown placed under the lower eyelashes and intermediate the eyelashes and surrounding facial skin tissue and in contact with such tissue. Section 13 has greater curvature as along outline 13a than section 12 and is designed for use with the upper side of the eye as illustrated in FIG. 2. Section 13 is placed between the upper lashes and the surrounding, rearwardly placed eye lid and in light contact therewith. As used herein, the relative terms of "less" or "greater" curvature as applied to sections like sections 12 and 13, respectively, are dependent on the radii of curvature defining the respective concave contours. A section having a smaller radius of curvature produces a section of greater curvature as compared to a section having a relatively larger radius of curvature.

Figure 4:
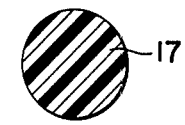
FIG. 4 is a section of FIG. 3 on the line 4—4.

The present instrument can take a variety of shapes or forms containing one or more outwardly directed contact concave sections. FIG. 3 is a front elevational view of such another form. It resembles a U-shape or yoke form, generally indicated at 15, in which opposed legs 16 and 17 terminate in outwardly directed contact concave sections 18 and 19, respectively. The yoke body may be of circular cross-section, as indicated in FIG. 4, the diameter of the circular cross-section varying along the length of the legs 16 and 17 as may be desired. Sections 18 and 19 are similar to sections 12 and 13, respectively, of the embodiment of FIGS. 1 and 2 in that section 18 has less curvature than section 19 and is designed for use along a lower side of an eye, while section 19 is designed for use along an upper side of an eye.

In order to render parts of the eye more apparent by color contrast, and especially the eyelashes for cosmetic application to them, the present eye instrument may have a color contrasting with that of the normal colors of human eyelashes. Since human eyelashes have really a fairly limited number of colors, such as black, blond, sometimes light red, etc., there are a number of colors available which can be imparted to the resinous organic material forming the body of the present instrument which will form a contrast with all human eyelashes. For example, colors such as orange, purple, yellow, green, dark carmine red, a heavy opaque white, and the like can be used to provide a contrasting background. Such colors are referred to here and in the claims as "contrasting with normal colors of human eyelashes" and may be incorporated into the body defining the present instrument by conventional pigments or dyes. Pastel shades are usually preferred.

In use, an outwardly directed concave section of the instrument is placed immediately adjacent a side of an eye and intermediate that side which it contacts and the adjoining eyelashes, as illustrated in FIGS. 1 and 2. The instrument safely applies a slight pressure on the side or edge of the eye which has the effect of steadying the eye and relaxing adjacent facial muscles. This has the added effect of relaxing the person whose eye is to be administered to, especially when the administration is being offered by a second person. Part of the cause of the usual tension in such a situation lies in the uncertainty of the administration and the inability to keep a normally sensitive eye relaxed.

With the shielding instrument in position, various treatments of the eye can be undertaken. For example, mascara can be applied as by a brush or removed as by tissue paper with respect to the eyelashes, all with no smearing of the mascara. The problem of applying mascara without smudging it is a universal one for women. Time is wasted cleansing and repairing smudged areas. The present instrument can be used for other like cosmetic purposes. For example, it can be used to apply or remove false eyelashes whether of the type in which a strip of eyelashes is applied or of the type in which individual eyelashes are singly attached. In all of such cases, the present application instrument, when of a contrasting color especially, makes the eyelashes more readily visible against the backdrop of the instrument and therefore more easily administered to.

In like manner, medicinal preparations can be applied to an eye with ease and convenience by virtue of the present instrument. For instance, ointment, ophthalmic creams, eye lubricants, eye drops, and the like can be more easily applied to the eye or eyelids. Whether used for cosmetic or medicinal purposes, the present instrument avoids rubbing of thin facial tissues adjacent the eye and its resultant rupture. Excessive rubbing, pulling the skin when cleansing it can further tissue breakdown giving rise to wrinkles or infection. The present invention combines simplicity and utility in caring for the human eye.

While the foregoing illustrates preferred embodiments of the present invention, it is understood that the invention may be practiced in still other forms within the scope of the following claims.

I claim:

1. An instrument for administering to a human eye including a body of substantially sterile, resinous, organic material having two contact sections, each being provided with an outwardly directed concave contour adapted to be placed in close proximity to and in substantially matching curvature in contact with a side of a human eye to steady the eye and facilitate application to or removal from the eye of adjunctive material, one contact section having a greater outwardly directed concavity than the other and being adapted for use in contact with the upper side of a human eye.

2. The instrument of claim 1 in which said resinous, organic material is a thermoplastic, polymeric resin.

3. The instrument of claim 1 in which said resinous, organic material is a resin selected from the group consisting of polyethylene, polypropylene, nylon, polystyrene, polyvinyl chloride, polymethacrylic acid, polymethacrylic acid esters, and polyvinyl acetate.

4. The instrument of claim 1 in which said resinous, organic material has a color contrasting with normal colors or human eyelashes.

5. The instrument of claim 1 in which said body is of generally linear configuration, each terminal portion of said configuration being provided with one of said two contact sections having an outwardly directed concave contour.

6. The instrument of claim 1 in which said body is generally U-shaped, each leg of the U-shape being provided with one of said two contact sections having an outwardly directed concave contour.

7. A shielding instrument for administering to a human eye including a body of substantially sterile, resinous organic material of a color contrasting with normal colors of human eyelashes, said body having a pair of eye-fitting sections, each section having an outwardly directed concave contour adapted to fit intermediate an eyelash and a side of an eye, one section having a greater outwardly directed concavity than the other and being adapted for use with the upper side of a human eye, the other section being adapted for use with the lower side of such eye, said instrument serving to steady the eye and facilitate application to and removal from the eye of adjunctive material.

* * * * *